J. D. FORD.
SPRAYING APPARATUS.
APPLICATION FILED FEB. 23, 1910.
1,005,822.
Patented Oct. 17, 1911.
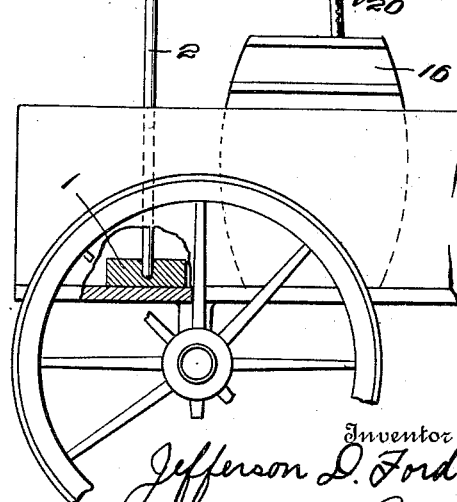

UNITED STATES PATENT OFFICE.

JEFFERSON D. FORD, OF MARYVILLE, MISSOURI.

SPRAYING APPARATUS.

1,005,822.  Specification of Letters Patent.  Patented Oct. 17, 1911.

Application filed February 23, 1910. Serial No. 545,375.

*To all whom it may concern:*

Be it known that I, JEFFERSON D. FORD, a citizen of the United States, residing at Maryville, in the county of Nodaway and State of Missouri, have invented new and useful Improvements in Spraying Apparatus, of which the following is a specification.

My invention relates to spraying apparatus and more particularly to devices for elevating a spraying nozzle and for holding it in an operative position above the tree, vine or shrub being sprayed or among the branches or foliage thereof.

My invention has for its object the production of a device which will be more efficient and convenient, and at the same time, cheaper and more easily constructed and manufactured than any similar device now upon the market and in use.

At present fruit growers are in the habit of erecting a platform or placing a ladder in the wagon or other vehicle which carries the spraying apparatus. A man is sent to the top of the ladder, or platform carrying the hose, from which height he is enabled to spray the tops of the trees very efficiently, but with great danger or, at least, inconvenience to himself.

It is an object of my invention to overcome this danger and remove the inconvenience by producing a device which will take the place of the platform or ladder, which may be operated from the wagon, but at the same time, which will spray the tops of the trees just as effectively as any known method will do so.

A still further object of my invention is to produce an elevating device which may be adjusted to different heights, which may be turned either to the right or to the left, and the nozzle of which may be either raised or depressed by the operator in the wagon.

With the foregoing and other objects in view, my invention consists in such details of construction and in the arrangement or combination of parts, as will be hereinafter more fully described and specifically pointed out in the claims.

In describing my invention of detail reference will be had in the accompanying drawings in which like characters denote like or corresponding parts and in which:—

Figure 1 is a view in side elevation of my invention showing it in operative position in a wagon, certain parts of the latter being broken away in order to more clearly show the construction; and, Fig. 2 is an enlarged detailed view showing the method of connecting the adjustable pipe to the standard and to the operating lever.

In carrying my invention into practice I necessarily provide a base 1 which in the drawings is disclosed as being disposed upon the floor of a wagon. It is understood that this base may be of any suitable construction and may be placed not only in a wagon, but in any position that may under particular circumstances seem best. The base preferably comprises a block having a suitable aperture, therein, a standard 2 being erected upon said base and rotatable in said aperture. Disposed at suitable distances apart and passing laterally through the standard 2 are a plurality of holes, 3, the purpose of which will be hereinafter more fully disclosed. A hollow pipe 4 of suitable length is provided with a collar 5 near one end thereof, said collar 5 being formed with an ear 6 which has a perforation therein adapted to register with any of the holes 3 in the standard 2. It will be seen that by passing a cotter pin through the aperture 3, and the perforation in the collar 5, the pipe 4 may be pivotally connected to the standard 2 at any height from the wagon bed. The outer end of said pipe 4 is provided with a spraying nozzle 8 which may be of any known construction.

A hand lever 9 is pivotally connected at 10 to the standard 2 in such a position that it may be easily reached by a person in the wagon. The numeral 11 designates an operating lever which is of less length than the standard 2, and which is pivotally connected at 12 to the hand lever 9, and at 13 to the rear end of the pipe 4, the latter connection being similar t othe pivotal connection between the pipe 4 and the standard 2 as before described. Laterally extending apertures 13 pierce the lever 11 at intervals in such manner that apertures 13 correspond with the holes 3 in the standard 2, by which construction the pipe 4 may be adjusted in different positions. One end of the pipe 4 is reduced and corrugated at 14 in order to receive and hold a hose 15 which passes downward into a suitable tank 16 carried by the wagon. I desire it to be understood that I am not limited to the form of tank disclosed in the drawings inasmuch as this forms no part of my invention. It is also noted that a suitable pump is to be used in connection with my invention which pump may be placed in any relation to the tank 16 and which may be of any construction. The dotted lines 17 show the pipe 4 in another position. It will be understood that said pipe may be arranged in any other position than that shown, or if occasion arises two or more similar pipes may be placed in position upon the standard 2 and lever 11 and may be operated from the handle 9 simultaneously. If the lever 9 is moved upward in the direction of the arrow 18, the nozzle 8 will move in the direction of the arrow 19 whereas if the lever 9 is moved as indicated by the arrow 20, the nozzle 8 will move upward toward 21. Movement of the lever 9 to the right or to the left will of course transmit a reverse motion to the nozzle 8.

I desire it to be understood that I am not limited to the exact construction and arrangement of details as hereinbefore set forth and disclosed by the drawings, but that I may make slight changes in my invention provided such changes fall within the scope of the claims hereinafter appended.

What I claim as new and desire to secure by Letters Patent is:—

1. Spraying apparatus comprising a base, a standard erected thereon, a hand lever pivoted to the standard, an operating lever pivoted to the hand lever, a pipe, and means whereby said pipe may be adjusted at various points along the length of said standard and said operating lever.

2. A spriying apparatus comprising a standard, a hand lever pivoted upon said standard, an operating lever carried by said hand lever, a pipe carried by said standard and said operating lever, spaced collars on said pipe, ears on said collars, and pins passed through said standard and said operating lever adapted to engage said ears.

3. A spraying apparatus comprising a base, a standard mounted upon said base and having apertures therein, a hand lever pivoted to said standard, an operating lever pivoted to said hand lever and having apertures therein, a pipe, collars removably fitted about said pipe, ears on said collars provided with apertures adapted to register with the apertures in said standard and said operating lever, and securing means passing through said registering apertures.

JEFFERSON D. FORD.

Witnesses:
MARTIN A. LEWIS,
MARSHALL E. FORD.

---

Copies of this patent may be obtained for five cents each, by addressing the "Commissioner of Patents, Washington, D. C."